United States Patent
Gantt, Jr. et al.

(10) Patent No.: US 11,084,483 B2
(45) Date of Patent: Aug. 10, 2021

(54) DYNAMIC FUEL ECONOMY MODE

(71) Applicant: GM GLOBAL TECHNOLOGY OPERATIONS LLC, Detroit, MI (US)

(72) Inventors: Gary W. Gantt, Jr., Chesterfield Township, MI (US); Rogerio Vollet, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 323 days.

(21) Appl. No.: 16/391,932

(22) Filed: Apr. 23, 2019

(65) Prior Publication Data
US 2020/0339101 A1    Oct. 29, 2020

(51) Int. Cl.
*B60W 20/15* (2016.01)
*B60W 10/26* (2006.01)
*B60W 10/30* (2006.01)
*B60W 50/08* (2020.01)

(52) U.S. Cl.
CPC ............ *B60W 20/15* (2016.01); *B60W 10/26* (2013.01); *B60W 10/30* (2013.01); *B60W 50/08* (2013.01); *B60W 2400/00* (2013.01); *B60W 2510/244* (2013.01); *B60W 2510/246* (2013.01); *B60W 2710/242* (2013.01)

(58) Field of Classification Search
CPC ...... B60W 20/15; B60W 10/26; B60W 10/30; B60W 50/08; B60W 2400/00; B60W 2510/244; B60W 2510/246; B60W 2710/242
See application file for complete search history.

(56) References Cited

U.S. PATENT DOCUMENTS

| | | | |
|---|---|---|---|
| 9,567,967 B2* | 2/2017 | Miyashita | B60W 10/06 |
| 2010/0066309 A1* | 3/2010 | Labrunie | H02J 7/35 320/141 |
| 2015/0307082 A1* | 10/2015 | Nallapa | B60L 53/64 701/22 |

* cited by examiner

*Primary Examiner* — Ramsey Refai
(74) *Attorney, Agent, or Firm* — Lorenz & Kopf LLP (57) ABSTRACT

In exemplary embodiments, methods, systems, and vehicles are provided for controlling operation of a vehicle in a fuel economy mode. In one embodiment, a vehicle is includes a battery, a generator, and a control system for controlling operation of the vehicle in a fuel economy mode, the control system including: (i) one or more current sensors configured to measure a battery current of the battery; and (ii) a processor coupled to the one or more current sensors and configured to at least facilitate controlling operation of the battery and the generator in the fuel economy mode utilizing a dynamic voltage threshold that is adjusted based on a comparison of the battery current with a baseload current threshold.

20 Claims, 3 Drawing Sheets

DYNAMIC FUEL ECONOMY MODE

BACKGROUND

The technical field generally relates to vehicles, and more particularly relates to a methods and systems for controlling a vehicle in a dynamic fuel economy mode.

Many vehicles today use a battery and a generator to provide current, for example to start an engine of the vehicle and to power lighting and/or other features of the vehicle. Existing techniques may not always provide optimal fuel savings with respect to usage of the battery and the generator.

Accordingly, it may be desirable to provide improved methods and systems for utilizing a battery and a generator in a vehicle, for example in a fuel economy mode.

SUMMARY

In one exemplary embodiment, a method is provided for controlling operation of a vehicle in a fuel economy mode, the vehicle having a battery and a generator, the method including: (i) measuring, via the one or more current sensors, a battery current of the battery; and (ii) controlling operation of the battery and the generator in the fuel economy mode, via instructions provided by a processor, utilizing a dynamic voltage threshold that is adjusted based on a comparison of the battery current with a baseload current threshold.

Also in one embodiment, the method further includes: (i) determining, via the processor, an initial value of a dynamically adjusted voltage threshold, via a processor; and (ii) incrementing, via the processor, the dynamically adjusted voltage threshold when the battery current exceeds the baseload current threshold.

Also in one embodiment, (i) the step of incrementing the dynamically adjusted voltage threshold includes incrementing, via the processor, the dynamically adjusted voltage threshold when the battery current exceeds the baseload current threshold, provided that the dynamically adjusted voltage threshold has not exceeded a maximum voltage calibration threshold for the vehicle; and (ii) the method further includes exiting the fuel economy mode, when the dynamically adjusted voltage threshold has exceeded the maximum voltage calibration threshold for the vehicle.

Also in one embodiment, the method further includes decrementing, via the processor, the dynamically adjusted voltage threshold when the battery current is less than the baseload current threshold for a predetermined amount of time.

Also in one embodiment: (i) the method further includes measuring, via one or more voltage sensors, a voltage of the battery; and (ii) the step of controlling operation of the battery and the generator in the fuel economy mode includes operating, via instructions provided by the processor, the battery in a charge depletion mode, with the generator turned off or providing minimum current support, when the voltage of the battery is greater than or equal to the dynamically adjusted voltage threshold.

Also in one embodiment, the step of controlling operation of the battery and the generator in the fuel economy mode further includes operating, via instructions provided by the processor, the battery in a charge neutral mode, with the generator turned on, when the state of charge of the battery is at the minimum acceptable level.

Also in one embodiment, (A) the vehicle includes an engine; (B) the method further includes: (i) measuring, via a sensor array: (a) a temperature of the battery; (b) a state of charge of the battery; (c) a voltage on the battery, and (d) an electrical current load on the battery; and (ii) initiating, via the processor, the fuel economy mode when each of the following is satisfied, namely: (a) the temperature of the battery is greater than a first predetermined threshold; (b) the state of charge of the battery is greater than a second predetermined threshold; and (c) the measured voltage at the battery is higher than the desired voltage setpoint commanded at the generator; and (C) the electrical current load on the battery of the vehicle is less than a third predetermined threshold.

In another exemplary embodiment, a system is provided for controlling operation of a vehicle in a fuel economy mode, the vehicle having a battery and a generator, the system including: (i) one or more current sensors configured to measure a battery current of the battery; and (ii) a processor coupled to the one or more current sensors and configured to at least facilitate controlling operation of the battery and the generator in the fuel economy mode utilizing a dynamic voltage threshold that is adjusted based on a comparison of the battery current with a baseload current threshold.

Also in one embodiment, the processor is further configured to at least facilitate: (i) determining an initial value of a dynamically adjusted voltage threshold; and (ii) incrementing the dynamically adjusted voltage threshold when the battery current exceeds the baseload current threshold.

Also in one embodiment, the processor is further configured to at least facilitate: (i) incrementing the dynamically adjusted voltage threshold when the battery current exceeds the baseload current threshold, provided that the dynamically adjusted voltage threshold has not exceeded a maximum voltage calibration threshold for the vehicle; and (ii) exiting the fuel economy mode, when the dynamically adjusted voltage threshold has exceeded the maximum voltage calibration threshold for the vehicle.

Also in one embodiment, the processor is further configured to at least facilitate decrementing the dynamically adjusted voltage threshold when the battery current is less than the baseload current threshold for a predetermined amount of time.

Also in one embodiment, one or more voltage sensors configured to measure a voltage of the battery; and the processor is further configured to at least facilitate providing instructions for operating the battery in a charge depletion mode, with the generator turned off or providing minimum current support, when the voltage of the battery is greater than or equal to the desired voltage setpoint commanded to the generator.

Also in one embodiment, the processor is further configured to at least facilitate operating the battery in a charge neutral mode, with the generator turned on, when the voltage of the battery is less than the initial (desired) voltage setpoint commanded to the generator.

In another exemplary embodiment, a vehicle is provided that includes a battery, a generator, and a control system for controlling operation of the vehicle in a fuel economy mode, the control system including: (i) one or more current sensors configured to measure a battery current of the battery; and (ii) a processor coupled to the one or more current sensors and configured to at least facilitate controlling operation of the battery and the generator in the fuel economy mode utilizing a dynamic voltage threshold that is adjusted based on a comparison of the battery current with a baseload current threshold.

Also in one embodiment, the processor is further configured to at least facilitate: (i) determining an initial value of a dynamically adjusted voltage threshold; and (ii) incrementing the dynamically adjusted voltage threshold when the battery current exceeds the baseload current threshold.

Also in one embodiment, the processor is further configured to at least facilitate: (i) incrementing the dynamically adjusted voltage threshold when the battery current exceeds the baseload current threshold, provided that the dynamically adjusted voltage threshold has not exceeded a maximum voltage calibration threshold for the vehicle; and (ii) exiting the fuel economy mode, when the dynamically adjusted voltage threshold has exceeded the maximum voltage calibration threshold for the vehicle.

Also in one embodiment, the processor is further configured to at least facilitate decrementing the dynamically adjusted voltage threshold when the battery current is less than the baseload current threshold for a predetermined amount of time.

Also in one embodiment, (i) the control system further includes one or more voltage sensors configured to measure a voltage of the battery; and (ii) the processor is further configured to at least facilitate providing instructions for operating the battery in a charge depletion mode, with the generator turned off or providing minimum current support, when the voltage of the battery is greater than or equal to the initial (desired) voltage setpoint commanded to the generator.

Also in one embodiment, the processor is further configured to at least facilitate operating the battery in a charge neutral mode, with the generator turned on, when the voltage of the battery is less than the initial (desired) voltage setpoint commanded to the generator.

Also in one embodiment, (i) the vehicle includes an engine; (ii) the control system further includes one or more sensors configured to measure: (a) a temperature of the battery; (b) a state of charge of the battery; (c) a voltage on the battery, and (d) a load on the engine; and (iii) the processor is further configured to at least facilitate providing instructions for initiating the fuel economy mode when each of the following is satisfied, namely: (a) the temperature of the battery is greater than a first predetermined threshold; and (b) the state of charge of the battery is greater than a second predetermined threshold.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
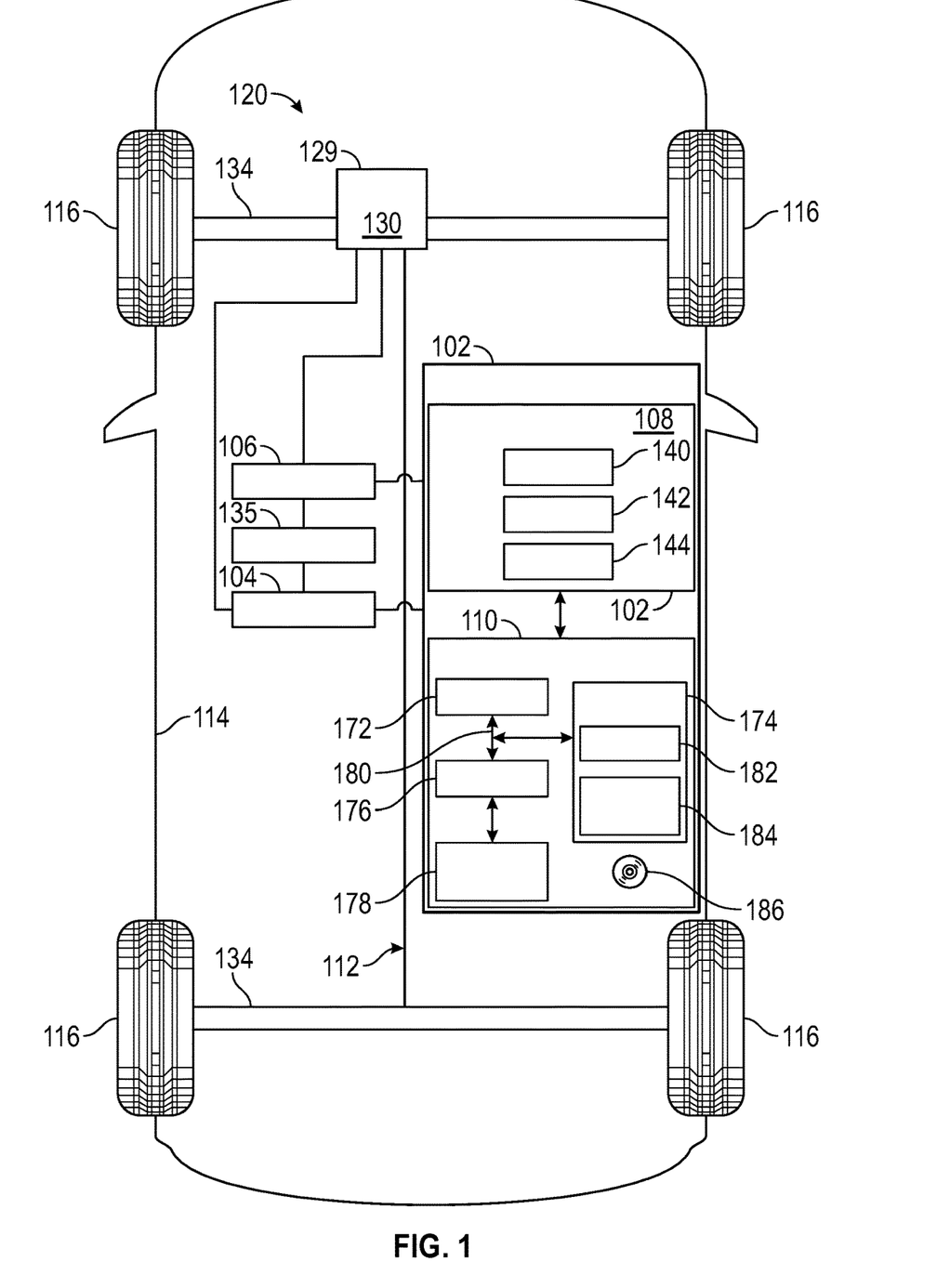
FIG. 1 is a functional block diagram of a vehicle that includes a battery, a generator, and a control system configured to control operation of the vehicle in a fuel economy mode via selective control of the battery and the generator using a dynamic voltage threshold, in accordance with exemplary embodiments.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In addition, in certain embodiments, the vehicle 100 may comprise any one of a number of other types of vehicles.

As described in greater detail further below, the vehicle 100 includes a control system 102 for controlling operation of the vehicle 100 in a fuel economy mode via selective control of a battery 104 and a generator 106 of the vehicle 100. Specifically, as discussed further below, the control system 102 controls the battery 104 and the generator 106 in a fuel economy mode for the vehicle 100 by monitoring electric current expectations for the battery 104 and dynamically adjusting a voltage threshold based on changes in the battery 104's electric current, for example as set forth in greater detail in the process 400 described further below in connection with FIG. 4. In the depicted embodiment, the control system 102 includes a sensor array 108 and a controller 110, discussed further below.

As depicted in FIG. 1, the vehicle 100 includes, in addition to the above-referenced control system 102, battery 104, and generator 106, a chassis 112, a body 114, and four wheels 116. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In one the depicted embodiment, the actuator assembly 120 includes an engine and/or motor 130. In one embodiment, the motor/engine 130 comprises a gasoline combustion engine that also drives the generator 106. In other embodiments, the motor/engine 103 may be powered by a rechargeable energy storage system (RESS) (one or more other batteries and/or other energy storage system different from battery 104) using an inverter and/or power converter, and the generator 106 may be replaced by a different power converter that act as the generator for the voltage/current bus where the battery 104 is part of.

Still referring to FIG. 1, the motor/engine 130 is coupled to at least some of the wheels 116 through one or more drive shafts 134. In some embodiments, the motor/engine 130 is mechanically coupled to the generator 106. In other embodiments, the motor/engine 130 may be an electric motor that is mechanically coupled to the transmission. In certain other embodiments (e.g. electrical vehicles), an engine and/or transmission may not be necessary. When the motor/engine 130 is an electric motor driven by a RESS, it is not directly tied to the generator 106. In this case, the generator 106 is replaced by a power converter driven by the RESS, but retaining its purpose of generating power (voltage/current) on the same energy bus that the battery 104 is connected to.

In various embodiments, the battery 104 is used to provide electric power to start the engine 130. In addition, in various embodiments, the battery and generator 106 are used to provide electric power to operator various other vehicle systems 135, such as including, by way of example, lighting, electronic control units (ECUs), actuators, pumps motors, infotainment systems, climate control systems, and/or other vehicle devices and/or systems. In certain embodiments, the battery 104 comprises a twelve-volt (12V) battery; however, this may vary in other embodiments.

In one embodiment, the control system 102 is mounted on the chassis 112. As noted above, in various embodiments, the control system 102 comprises a sensor array 108 and a controller 110, as discussed below.

In various embodiments, the sensor array 108 includes various sensors that measure or otherwise obtain data pertaining to operation of the vehicle 100, including the battery 104. In the depicted embodiment, the sensor array 108 includes one or more current sensors 140, voltage sensors 142, and temperature sensors 144.

In various embodiments, the current sensors 140 measure an electric current of the battery 104. In certain embodiments, the current sensors 140 also measure an electric load of the vehicle 100 (e.g., an electric load for the running the engine 130 and/or other systems 135 of the vehicle 100). Also in various embodiments, the voltage sensors 142 measure an electric voltage of the battery 104. In addition, in various embodiments, the temperature sensors 144 measure a temperature of the battery 104.

In various embodiments, the sensor array 108 provides the sensor data to the controller 110 (e.g. the processor 172 thereof) for processing, for example as set forth in greater detail below. Also in various embodiments, the sensor array 108 performs these and other functions in accordance with the steps of the process 400 described further below in connection with FIG. 4.

The controller 110 is coupled to the sensor array 108, and to the battery 104 and the generator 106. In various embodiments, the controller 110 utilizes the various inputs and data provided via the sensor array 108, and controls the battery 104 and the generator 106 in a fuel economy mode for the vehicle 100 by monitoring electric current expectations for the battery 104, using the sensor data, and dynamically adjusting a voltage threshold based on changes in the battery 104's electric current. In various embodiments, the controller 110, along with the sensor array 108, provide these and other functions in accordance with the steps discussed further below in connection with the schematic drawings of the vehicle 100 in FIG. 1 and the flowcharts and schematic drawings pertaining to the process 400 described further below.

As depicted in FIG. 1, the controller 110 comprises a computer system. In certain embodiments, the controller 110 may also include one or more of the sensors of the sensor array 108, one or more other devices and/or systems, and/or components thereof. In addition, it will be appreciated that the controller 110 may otherwise differ from the embodiment depicted in FIG. 1. For example, the controller 110 may be coupled to or may otherwise utilize one or more remote computer systems and/or other control systems, such as the wheels 116, battery 104, generator 106, propulsion system 129, motor/engine 130, and/or one or more other systems of the vehicle 100. For example, in certain embodiments, the controller also controls the propulsion system 129 (e.g., including the engine 130), along with various other systems 135 of the vehicle 100. In addition, in certain embodiments, the controller 110 is part of one or more vehicle modules, such as an engine control module (ECM), body control module (BCM), and/or one or more other modules of the vehicle 100.

In the depicted embodiment, the computer system of the controller 110 includes a processor 172, a memory 174, an interface 176, a storage device 178, and a bus 180. The processor 172 performs the computation and control functions of the controller 110, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 110 and the computer system of the controller 110, generally in executing the processes described herein, such as the process 400 of FIG. 4.

The memory 174 can be any type of suitable memory. For example, the memory 174 may include various types of dynamic random-access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184 (e.g., one or more threshold values for implementing the fuel economy mode, for example as described further below).

The bus 180 serves to transmit programs, data, status and other information or signals between the various components of the computer system of the controller 110. The interface 176 allows communication to the computer system of the controller 110, for example from a system driver and/or another computer system, and can be implemented using any suitable method and apparatus. In one embodiment, the interface 176 obtains the various data from the sensors of the sensor array 108. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, optical disk drives, USB drives, and/or other storage devices. In one exemplary embodiment, the storage device 178 comprises a program product from which memory 174 can receive a program 182 that executes one or more embodiments of one or more processes of the present disclosure, such as the steps of the process 400 (and any sub-processes thereof) of FIG. 4.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as hard drives, memory cards, optical disks, other disks, USB drives, and so on, and transmission media such as digital and analog communication links. It will be appreciated that cloud-based storage and/or other techniques may also be utilized in certain embodiments. It will similarly be appreciated that the computer system of the controller 110 may also otherwise differ from the embodiment depicted in FIG. 1, for example in that the computer system of the controller 110 may be coupled to or may otherwise utilize one or more remote computer systems and/or other control systems.

While the components of the control system 102 (including the sensor array 108 and controller 110) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the battery 104, the generator 106, the actuator assembly 120 (e.g. the propulsion system 129 and/or the motor/engine 130), one or more other systems 135 of the vehicle 100, and/or as part of an engine control module (ECM), body control module (BCM), and/or one or more other modules of the vehicle 100.

Figure 2:
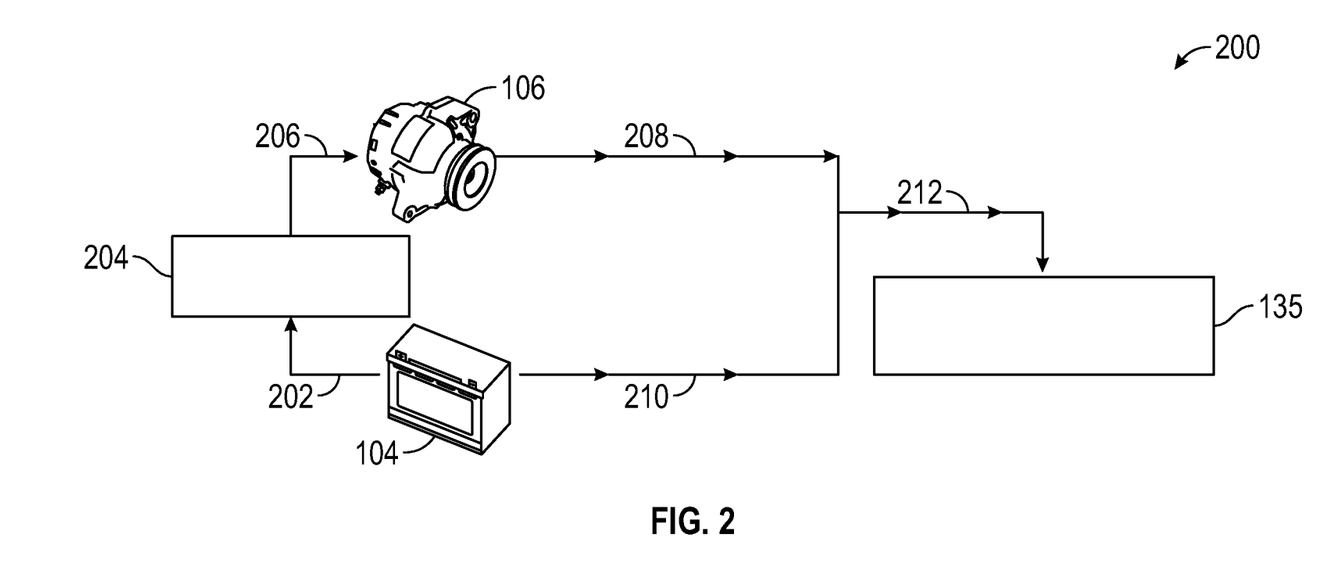
FIG. 2 is a flow diagram illustrating operation of the control system of the vehicle of FIG. 1, in accordance with exemplary embodiments.

FIG. 2 is a flow diagram showing a flow pattern 200 illustrating operation of the control system 102 of the vehicle of FIG. 1, in accordance with exemplary embodiments of the vehicle 100. For example as shown in FIG. 2, in certain embodiments, current, voltage, and temperature sensing 202 provided with respect to the battery 104. In various embodiments, the sensor array 108 obtains measurements of the current, voltage, and temperature via the respective current, voltage, and temperature sensors 140, 142, and 144 of FIG. 1.

Also in various embodiments, a dynamic fuel efficiency algorithm 204 is implemented using the values from the current, voltage, and temperature sensing 202. In various embodiments, the dynamic fuel efficiency algorithm 204 is stored in the memory 174 and executed and implemented via the processor 172 of FIG. 1. In certain embodiments, the dynamic fuel efficiency algorithm 204 provides dynamically adjusted settings for the battery 104 and the generator 106 for the fuel economy mode (for example as described in greater detail further below in connection with process 400 of FIG. 4).

In various embodiments, dynamic voltage control 206 is provided based on the dynamic fuel efficiency algorithm 204. In various embodiments, the processor 172 of FIG. 1 dynamically adjusts a voltage threshold for the generator 106 based on a monitoring of the electric current for the battery 104, and in certain embodiments also based on a monitoring of the voltage and temperature of the battery 104 (for example as described in greater detail further below in connection with process 400 of FIG. 4).

Also in various embodiments, the dynamic voltage threshold is used, by the processor 172 via the dynamic fuel efficiency algorithm 204, to control operation of the generator 106 and the battery 104. For example, in various embodiments, the battery 104 provides a baseline electric current 210 that is calibratable, while the generator 106 provides additional electric current 208 that is needed above the baseline value, as influenced by the dynamically adjusted voltage threshold (for example as described in greater detail further below in connection with process 400 of FIG. 4). Also in various embodiments, the baseline electric current 210 provided by the battery 104 and the additional electric current 208 provided by the generator 106 are used to power various other systems 135 of the vehicle, such as lighting, electronic control units (ECUs), actuators, pumps motors, infotainment systems, climate control systems, and/or other vehicle devices and/or systems.

Figure 3:
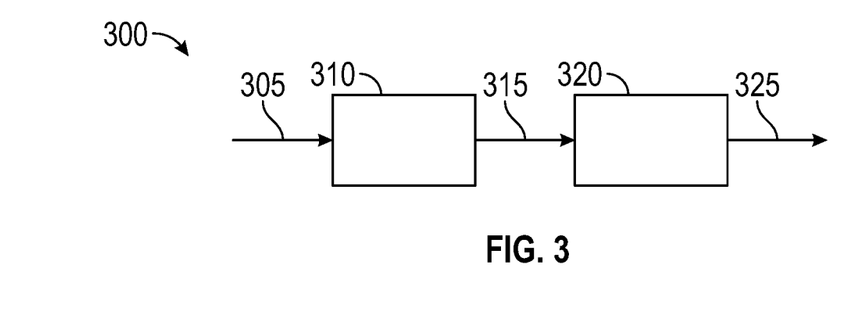
FIG. 3 is a block diagram illustrating exemplary data modules of the control system of the vehicle of FIG. 1, in accordance with exemplary embodiments.

FIG. 3 provides a functional block diagram for modules 300 of the control system 102 of FIG. 1, in accordance with exemplary embodiments. In various embodiments, each module includes and/or utilizes computer hardware, for example via one or more computer processors (e.g., the processor 172 of FIG. 1) and memory (e.g., the memory. As depicted in FIG. 3, in various embodiments, the modules 300 of the control system 102 generally includes a data module 310 and a processing module 320. In various embodiments, the data module 310 and the processing module 320 are disposed onboard the vehicle 100.

In various embodiments, the data module 310 collects vehicle data via the sensor array 108 of FIG. 1. In various embodiments, the data module 310 obtains measurements of the current, voltage, and temperature of the battery 104 and generator 106 of FIG. 1 via the respective current, voltage, and temperature sensors 140, 142, and 144 of FIG. 1 as inputs 305, and provides the measured values (and/or information pertaining thereto) as outputs 315 to the processing module 320.

In various embodiments, the processing module 320 utilizes the data from the data module 310 and controls the battery 104 and the generator 106 in a fuel economy mode for the vehicle 100 by monitoring electric current expectations for the battery 104 and dynamically adjusting a voltage threshold based on changes in the battery 104's electric current. Specifically, in various embodiments, the processing module 320 utilizes the measured data from the data module 310 as inputs for the dynamic fuel efficiency algorithm 204 of FIG. 2, providing instructions for dynamically adjusting a voltage threshold for the battery based on a monitoring of the electric current for the battery 104, and providing the instructions to the battery 104 and the generator 106 for control thereof via outputs 325 of the processing module 320 (for example as described in greater detail further below in connection with process 400 of FIG. 4).

Figure 4:
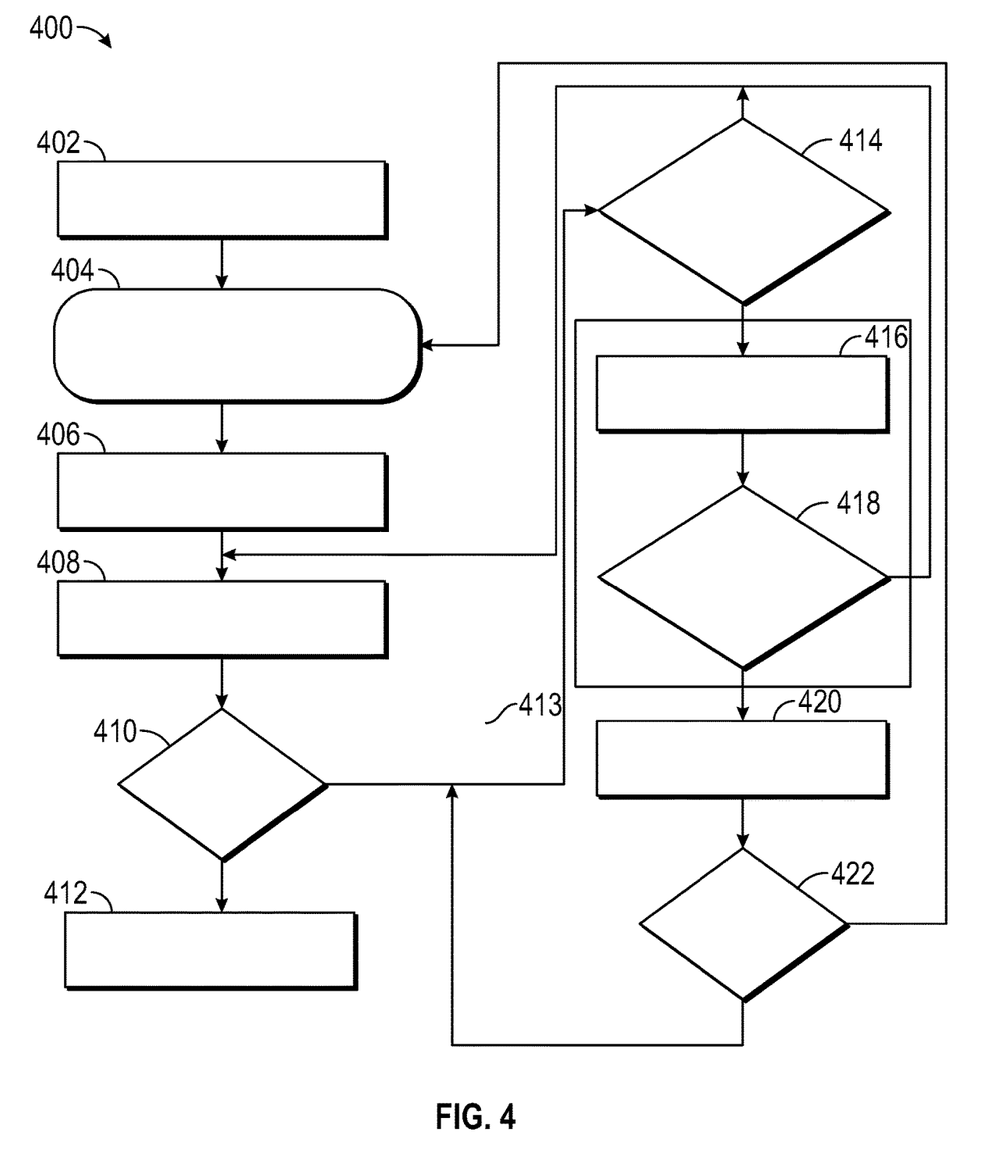
FIG. 4 is a flowchart of a process for controlling operation of the vehicle in a fuel economy mode via selective control of the battery and the generator using a dynamic voltage threshold, and that can be implemented in connection with the vehicle of FIG. 1, the control system of FIGS. 1 and 2, and the data modules of FIG. 3, in accordance with exemplary embodiments.

FIG. 4 is a flowchart of a process 400 for controlling operation of a vehicle in a fuel economy mode via selective control of a battery and a generator of the vehicle, in accordance with exemplary embodiments. Also in accordance with exemplary embodiments, the process 400 is can be implemented in connection with the vehicle 100 of FIG. 1, the control system 102 of FIGS. 1 and 2, and the modules 300 of FIG. 3, in accordance with exemplary embodiments.

As depicted in FIG. 4, in various embodiments the process 400 begins at step 402 with the collection of sensor data. In various embodiments, the sensor data is collected via the sensor array 108 of FIG. 1. In various embodiments, the current, voltage, and temperature sensors 140, 142, and 144 of FIG. 1 obtain measurements of the current, voltage, state of charge, and temperature of the battery 104 of FIG. 1, as well as an electric current load on the vehicle 100 (e.g., a load on the engine 130 to operate the other systems 135 of FIG. 1). In certain embodiments, measurements begin in step 402 when the vehicle 100 is turned on and/or begins travelling, and/or when one or more users of the vehicle 100 approach or enter the vehicle 100, when a user request has been received, and/or when a user request and/or use of the vehicle 100 is expected. Also in certain embodiments, the measurements of step 402 (and, in certain embodiments, each of the steps of the process 400) are performed continuously during operation of the vehicle 100.

In various embodiments, a battery charge depletion mode is initiated at step 404 once certain initial conditions are satisfied. Specifically, in various embodiments, the battery charge depletion mode is activated at step 404 once each of the requirements have been met, namely: (i) the battery temperature is a predetermined range; (ii) a state of charge of the battery 104 is greater than a predetermined threshold; (iii) initial (desired) generator voltage setpoint is achieved and is such that cause battery charge depletion (measured voltage at battery 104 is higher than the desired voltage setpoint commanded at the generator 106) and (iv) an electrical current load on the battery 104 is less than a predetermined threshold. In one exemplary embodiment: (i) the battery temperature is determined to be in a predetermined range when the battery temperature is greater than zero degrees Celsius (0° C.); (ii) the state of charge of the battery 104 is determined to be greater than its predetermined threshold when the state of charge is greater than eighty percent (80%); (iii) generator voltage setpoint is 12.5 volts and (iv) the electrical load as seen by the battery 104 (e.g., from the various other systems 135 of FIG. 1) is less than twenty five amperes (25 Amps); however, these values may vary in different embodiments. Also in various embodiments, these determinations are made by the processor 172 of FIG. 1 based on the sensor data of step 402, and the initiation of the battery depletion mode is performed via instructions provided by the processor 172 to the generator 106.

Specifically, in various embodiments, at step 404, an initial value for a dynamic voltage threshold is set, and instructions are provided by the processor 172 of FIG. 1 for the generator 106 to turn off or sustain the initial voltage setpoint that minimizes the load current support provided by the generator 106. As a result, the battery 104 continues to run in an electric current depletion mode as the generator 106 is turned off or providing insufficient current to support all electrical loads. This results in a reduced load on the engine 130 of FIG. 1, thereby resulting in potentially improved fuel economy for the vehicle 100. In various embodiments, the initial value for the dynamic voltage threshold/setpoint is set based on the battery 104 energy capacity and expected consumption of the electrical loads of the vehicle 100. In one embodiment, the initial voltage threshold is set equal to 12.5 volts; however, this may vary in other embodiments. In addition, in various embodiments, battery parameters continue to be measured in continued iterations of step 402, including an electric current of the battery 104.

In various embodiments, once the battery current exceeds a baseload threshold for the vehicle 100, a dynamic fuel economy mode is initiated at step 406. In one exemplary embodiment, the baseload threshold is equal to twenty-five amperes (25 Amps); however, this may vary in other embodiments. In various embodiments, the dynamic fuel economy mode is implemented via an adjustment of the dynamic voltage threshold via the processor 172 of FIG. 1, and by instructions from the processor 172 to turn on the generator 106, as the generator 106 provides the additional current required above that being provided by the battery 104 seeking to achieve the dynamic voltage threshold. In certain embodiments, during step 406, the battery 104 operates either discharging at a current level equal to or smaller than the baseload threshold target (25 Amps) or in a charge neutral mode (e.g., with zero amps on the battery) if the minimum acceptable state of charge level of the battery 104 has been reached, such that the battery 104 is no longer a load on the engine.

Specifically, in various embodiments, as part of the dynamic fuel economy mode, the dynamic voltage threshold is incremented at step 408. In certain embodiments, the processor 172 increments the dynamic voltage threshold by a relatively small, incremental amount (e.g., an increase from 12.5 to 12.6 volts, in one exemplary embodiment).

A determination is then made at step 410 as to whether the incremented dynamic voltage threshold is greater than a maximum voltage calibration threshold. In certain embodiments, the maximum voltage calibration threshold comprises a voltage ceiling for the vehicle 100 above which there would be little or no fuel savings for the vehicle 100 by utilizing the fuel economy mode. In certain embodiments, the maximum voltage calibration threshold is stored in the memory 174 of FIG. 1 as one of the stored values 184 thereof. In one exemplary embodiment, the maximum voltage calibration threshold is equal to 13 volts; however, this may vary in other embodiments. In various embodiments, the determination of step 410 is made by the processor 172 of FIG. 1.

If it is determined at step 410 that the incremented dynamic voltage threshold is greater than the maximum voltage calibration threshold, then the dynamic fuel economy mode is turned off. In various embodiments, this is performed by instructions provided by the processor 172. In addition, in certain embodiments, the process terminates.

Conversely, if it is instead determined at step 410 that the incremented dynamic voltage threshold is less than or equal to the maximum voltage calibration threshold, then the dynamic fuel economy mode remains turned on, and the process proceeds to step 414. In various embodiments, during step 413, the process 400 waits for a predetermined amount of time, in order to determine whether the battery current still exceeds the baseload threshold for the vehicle 100. Specifically, in various embodiments, no action is taken with respect to the dynamic fuel economy mode during this predetermined amount of waiting time (e.g., equal to five seconds in one embodiment, although this may vary in other embodiments).

After the predetermined amount of waiting time of step 413, a determination is then made at step 414 as to whether the battery current still exceeds the baseload threshold for the vehicle 100. In various embodiments, this determination is made by the processor 172 of FIG. 1 using updated battery current measurements from the current sensors 140 of FIG. 1.

If it is determined at step 414 that the battery current still exceeds the baseload threshold, then the process returns to step 408 in a new iteration, as the processor 172 increments the dynamic voltage threshold by another relatively small, incremental amount (e.g., an increase from 12.6 to 12.7 volts, in one exemplary embodiment). In various embodiments, steps 408-414 repeat in various iterations until a determination is made in an iteration of step 414 that the battery current no longer exceeds the baseload threshold.

Once a determination is made at step 414 that the battery current no longer exceeds the baseload threshold, then the process proceeds instead to step 416. During step 416, the dynamic voltage threshold is maintained at its present level. In addition, in various embodiments, the process 400 waits for a second predetermined amount of time, in order to determine whether the battery current will remain less than or equal to the baseload threshold. Specifically, in various embodiments, the vehicle remains in the dynamic fuel economy mode, and no further action is taken with respect to the dynamic fuel economy mode during this second predetermined amount of waiting time (e.g., ten seconds in one embodiment, although this may vary in other embodiments).

After the predetermined amount of waiting time of step 416, a determination is then made at step 418 as to whether the battery current exceeds the baseload threshold for the vehicle 100. In various embodiments, this determination is made by the processor 172 of FIG. 1 using updated battery current measurements from the current sensors 140 of FIG. 1.

If it is determined at step 418 that the battery current exceeds the baseload threshold, then the process returns to step 408 in a new iteration, as the processor 172 increments the dynamic voltage threshold by another relatively small, incremental amount (e.g., an increase from 12.7 to 12.8 volts, in one exemplary embodiment). In various embodiments, steps 408-418 repeat in various iterations until a determination is made in an iteration of step 418 that the battery current does not exceed the baseload threshold.

Once a determination is made at step 418 that the battery current does not exceed the baseload threshold (and the waiting period of the most recent iteration of step 416 has expired), then the process proceeds instead to step 420. During step 420, the processor 172 decrements the dynamic voltage threshold by a relatively small, incremental amount (e.g., a decrease from 12.8 back to 12.7 volts, in one exemplary embodiment).

In various embodiments, the fuel economy mode continues with the present dynamic threshold value, and a determination is made (preferably continually) at step 422 as to whether a measured voltage of the battery 104 matches the initial (desired) generator voltage setpoint. In various embodiments, this determination is made by the processor 172 of FIG. 1 using sensor data as obtained via the sensor array 108 of FIG. 1 in continuing iterations of step 402.

In various embodiments, if it is determined in step 422 that the battery voltage does not match the initial (desired) generator voltage setpoint, then the process returns to step 413 in a new iteration, for the waiting time and subsequent determination in a new iteration of step 414 as to whether the battery current exceeds the baseload threshold. Conversely, if it is instead determined in step 422 that the battery voltage matches the initial (desired) generator voltage setpoint value, then the process instead returns to step 404, as a new battery charge depletion mode is initiated in a new iteration of step 404 (and, in various embodiments, with the generator turned off or sustaining the initial voltage setpoint that minimizes the load current support provided by the generator 106, to thereby provide a lessened load on the engine and thereby a potentially improved fuel economy for the vehicle).

Accordingly, in various embodiments, a dynamic fuel economy mode is utilized for a vehicle using a dynamically adjusted dynamic voltage threshold. In various embodiments, the dynamic voltage threshold is adjusted based on a comparison of present battery current with a baseload current threshold for the vehicle. In various embodiments, the dynamic voltage threshold is adjusted (i) upward when the battery current exceeds the battery current threshold (subject to a maximum voltage calibration threshold); and (ii) downward when the battery current is comfortably below the baseload threshold (e.g., if the battery current remains less than or equal to the baseload threshold for a predetermined amount of time). When the battery voltage is equal to or exceeds the initial (desired) generator voltage setpoint, then the generator is either providing minimum current support or is turned off, respectively, and the battery is placed in a current depletion mode, to thereby provide a lessened load on the engine and thereby a potentially improved fuel economy for the vehicle.

It will be appreciated that the systems and methods may vary from those depicted in the Figures and described herein. For example, the vehicle 100, the control system 102, and/or components thereof, may vary from that depicted in FIG. 1 and/or described herein, in various embodiments. It will similarly be appreciated that the modules may vary from the depictions in FIG. 3 and the accompanying descriptions. It will also be appreciated that the depictions and processes (and/or subprocesses) disclosed herein may differ from those described herein and/or depicted in FIGS. 2 and 4, and/or that steps thereof may be performed simultaneously and/or in a different order as described herein and/or depicted in these Figures.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof

What is claimed is:

1. A method for controlling operation of a vehicle in a fuel economy mode, the vehicle having a battery and a generator, the method comprising:
   measuring, via one or more current sensors, a battery current of the battery; and
   controlling operation of the battery and the generator in the fuel economy mode, via instructions provided by a processor, utilizing a dynamic voltage threshold that is adjusted based on a comparison of the battery current with a baseload current threshold.

2. The method of claim 1, further comprising:
   determining, via the processor, an initial value of a dynamically adjusted voltage threshold; and
   incrementing, via the processor, the dynamically adjusted voltage threshold when the battery current exceeds the baseload current threshold.

3. The method of claim 2, wherein:
   the step of incrementing the dynamically adjusted voltage threshold comprises:

incrementing, via the processor, the dynamically adjusted voltage threshold when the battery current exceeds the baseload current threshold, provided that the dynamically adjusted voltage threshold has not exceeded a maximum voltage calibration threshold for the vehicle; and the method further comprises:

exiting the fuel economy mode, when the dynamically adjusted voltage threshold has exceeded the maximum voltage calibration threshold for the vehicle.

4. The method of claim 2, further comprising:

decrementing, via the processor, the dynamically adjusted voltage threshold when the battery current is less than the baseload current threshold for a predetermined amount of time.

5. The method of claim 2, further comprising:

measuring, via one or more voltage sensors, a voltage of the battery;

wherein the step of controlling operation of the battery and the generator in the fuel economy mode comprises:

operating, via instructions provided by the processor, the battery in a charge depletion mode, with the generator turned off or providing minimum current support, when the voltage of the battery is greater than or equal to the dynamically adjusted voltage threshold.

6. The method of claim 5, wherein the step of controlling operation of the battery and the generator in the fuel economy mode further comprises:

operating, via instructions provided by the processor, the battery in a charge neutral mode, with the generator turned on, when the state of charge of the battery is at the minimum acceptable level.

7. The method of claim 1, wherein the vehicle includes an engine, and the method further comprises:

measuring, via a sensor array:
a temperature of the battery;
a state of charge of the battery;
a voltage on the battery, and
an electrical current load on the battery; and initiating, via the processor, the fuel economy mode when each of the following is satisfied, namely:
the temperature of the battery is greater than a first predetermined threshold;
the state of charge of the battery is greater than a second predetermined threshold;
the measured voltage at the battery is higher than the desired voltage setpoint commanded at the generator; and
the electrical current load on the battery of the vehicle is less than a third predetermined threshold.

8. A system for controlling operation of a vehicle in a fuel economy mode, the vehicle having a battery and a generator, the system comprising:

one or more current sensors configured to measure a battery current of the battery; and a processor coupled to the one or more current sensors and configured to at least facilitate controlling operation of the battery and the generator in the fuel economy mode utilizing a dynamic voltage threshold that is adjusted based on a comparison of the battery current with a baseload current threshold.

9. The system of claim 8, wherein the processor is further configured to at least facilitate:

determining an initial value of a dynamically adjusted voltage threshold; and incrementing the dynamically adjusted voltage threshold when the battery current exceeds the baseload current threshold.

10. The system of claim 9, wherein the processor is further configured to at least facilitate:

incrementing the dynamically adjusted voltage threshold when the battery current exceeds the baseload current threshold, provided that the dynamically adjusted voltage threshold has not exceeded a maximum voltage calibration threshold for the vehicle; and exiting the fuel economy mode, when the dynamically adjusted voltage threshold has exceeded the maximum voltage calibration threshold for the vehicle.

11. The system of claim 9, wherein the processor is further configured to at least facilitate:

decrementing the dynamically adjusted voltage threshold when the battery current is less than the baseload current threshold for a predetermined amount of time.

12. The system of claim 11, further comprising:

one or more voltage sensors configured to measure a voltage of the battery;

wherein the processor is further configured to at least facilitate providing instructions for operating the battery in a charge depletion mode, with the generator turned off or providing minimum current support, when the voltage of the battery is greater than or equal to the desired voltage setpoint commanded to the generator.

13. The system of claim 12, wherein the processor is further configured to at least facilitate:

operating the battery in a charge neutral mode, with the generator turned on, when the voltage of the battery is less than the initial desired voltage setpoint commanded to the generator.

14. A vehicle comprising:

a battery;
a generator; and
a control system for controlling operation of the vehicle in a fuel economy mode, the control system comprising:
one or more current sensors configured to measure a battery current of the battery; and
a processor coupled to the one or more current sensors and configured to at least facilitate controlling operation of the battery and the generator in the fuel economy mode utilizing a dynamic voltage threshold that is adjusted based on a comparison of the battery current with a baseload current threshold.

15. The vehicle of claim 14, wherein the processor is further configured to at least facilitate:

determining an initial value of a dynamically adjusted voltage threshold; and incrementing the dynamically adjusted voltage threshold when the battery current exceeds the baseload current threshold.

16. The vehicle of claim 15, wherein the processor is further configured to at least facilitate:

incrementing the dynamically adjusted voltage threshold when the battery current exceeds the baseload current threshold, provided that the dynamically adjusted voltage threshold has not exceeded a maximum voltage calibration threshold for the vehicle; and exiting the fuel economy mode, when the dynamically adjusted voltage threshold has exceeded the maximum voltage calibration threshold for the vehicle.

17. The vehicle of claim 15, wherein the processor is further configured to at least facilitate:

decrementing the dynamically adjusted voltage threshold when the battery current is less than the baseload current threshold for a predetermined amount of time.

18. The vehicle of claim 15, wherein:
the control system further comprises one or more voltage sensors configured to measure a voltage of the battery; and
the processor is further configured to at least facilitate providing instructions for operating the battery in a charge depletion mode, with the generator turned off or providing minimum current support, when the voltage of the battery is greater than or equal to the initial desired voltage setpoint commanded to the generator.

19. The vehicle of claim 18, wherein the processor is further configured to at least facilitate:
operating the battery in a charge neutral mode, with the generator turned on, when the voltage of the battery is less than the initial desired voltage setpoint commanded to the generator.

20. The vehicle of claim 14, further comprising:
an engine;
wherein the control system further comprises one or more sensors configured to measure:
a temperature of the battery;
a state of charge of the battery;
a voltage on the battery, and
a load on the engine; and
the processor is further configured to at least facilitate providing instructions for initiating the fuel economy mode when each of the following is satisfied, namely:
the temperature of the battery is greater than a first predetermined threshold;
the state of charge of the battery is greater than a second predetermined threshold;
the measured voltage at the battery is higher than the desired voltage setpoint commanded at the generator; and
the electrical current load on the battery of the vehicle is less than a third predetermined threshold.

* * * * *